Aug. 4, 1964  R. A. SNOW  3,143,430
METHOD OF PACKAGING CHEESE CURD
Filed Dec. 12, 1961  2 Sheets-Sheet 1

*INVENTOR.*
ROBERT A. SNOW
BY Warren F. B. Lindsey
ATTORNEY

Aug. 4, 1964
R. A. SNOW
3,143,430
METHOD OF PACKAGING CHEESE CURD
Filed Dec. 12, 1961
2 Sheets-Sheet 2
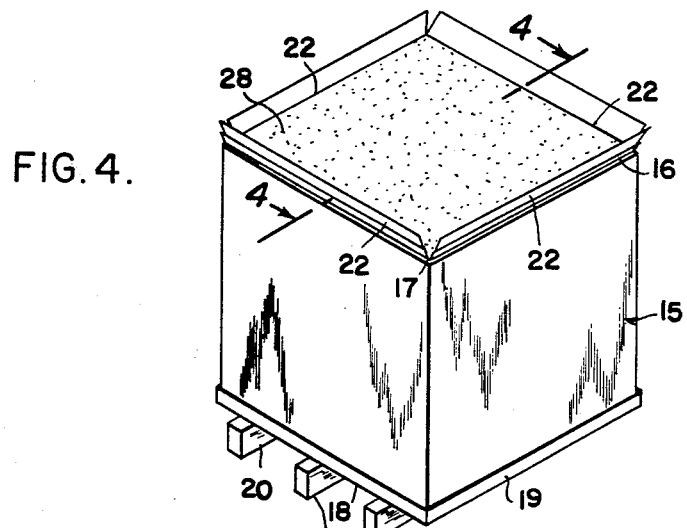
FIG. 4.
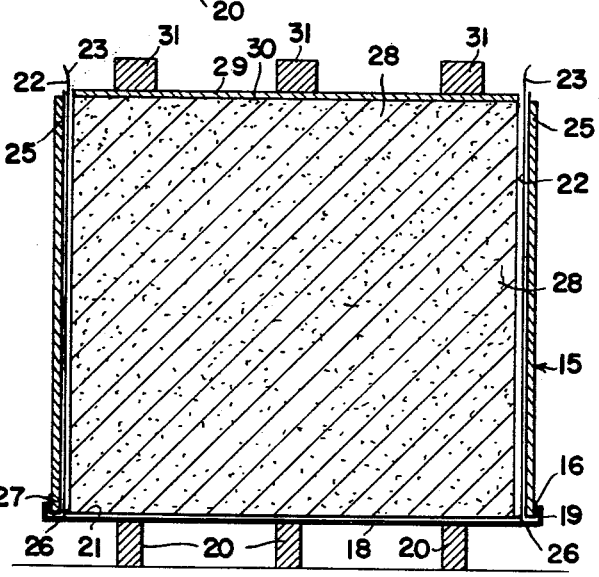
FIG. 5.
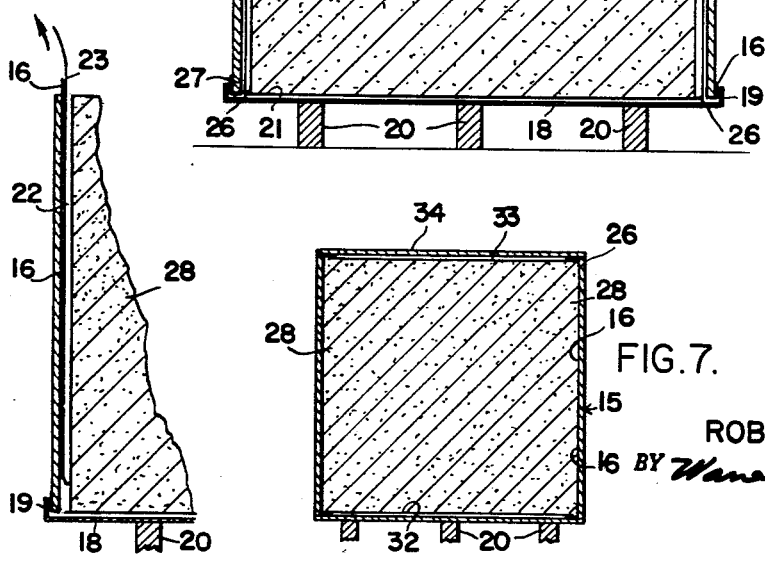
FIG. 6.
FIG. 7.
INVENTOR.
ROBERT A. SNOW
BY *Warren F. B. Lindsley*
ATTORNEY United States Patent Office 3,143,430
Patented Aug. 4, 1964

3,143,430
METHOD OF PACKAGING CHEESE CURD
Robert A. Snow, Green Bay, Wis., assignor, by mesne assignments, to L. D. Schreiber Cheese Co., Inc., Green Bay, Wis., a corporation of Wisconsin
Filed Dec. 12, 1961, Ser. No. 158,741
13 Claims. (Cl. 99—178)

This invention relates to packaging cheese and more particularly to a method of wrapping blocks of cheese curd while held in a retainer.

Heretofore, when large blocks of cheese curd of, for example 480 pounds or more, were wrapped for storage and sale the retainers within which the cheese curd was poured and pressed were lined with an impervious lining. After draining the curd the lining was sealed at its ends to complete the wrapping of the cheese.

This method proved to be unsatisfactory for the following reasons:

(1) The build-up of whey pockets between the impervious lining and the pieces of curd prevents a smooth continuous closed surface from forming. Perforated or broken surfaces greatly reduce the attractiveness and value of the product; and (2) The moist surfaces developed have a whey tainted flavor which reduces the attractiveness, quality and therefore the value of the product.

The normal procedure for overcoming these defects is to manufacture smaller blocks of cheese, such as for example 40 pound blocks which can be formed by lining a mold or hoop with an absorbent material such as bleached muslin, pouring the curd into the mold or hoop, placing the end and side flaps of the muslin over the horizontal end surfaces of the curd to completely encase the curd in absorbent material, placing a lid on the mold or hoop and applying pressure to the curd. This pressure expels the whey causing the curd to knit together into a solid mass. The capillary action of the absorbent material drains the surface whey away, thus preventing the build-up of whey pockets between the curd and the mold or hoop resulting in a smooth continuous cheese surface. After a predetermined pressing time the cheese block is removed from the mold or hoop and the absorbent wrapper is removed from the cheese. An impervious film is then wrapped around the cheese block and the cheese block is encased in a container suitable for shipping and storage.

The above method of draining and wrapping large blocks of cheese, for example 480 pounds or more, is not satisfactory because it is not practical to press a large block of cheese of this size in a mold or hoop, then remove it, wrap it in an impervious film and transfer it to a shipping container. At this stage in the manufacture of the product, the cheese is soft and would not retain its shape sufficiently to permit placing it in a shipping container utilizing the tolerances required in the trade.

One of the important reasons for developing a large package of this size is to effect savings in labor, handling and packaging costs. Therefore, it is essential that the cheese be pressed in its shipping container which is previously lined with an impervious film which will serve as a barrier against shrinkage, mold and deterioration. To increase whey drainage of the cheese curd along the sides of the block of cheese and to form a smooth continuous closed cheese surface an absorbent cloth should be used between the impervious film lining along the inside walls of the retainer and the cheese curd. To accomplish this the block of cheese would have to be removed from the retainer in order to remove the cheese cloth from the cheese. This would be impractical because large blocks of cheese would not hold their shape outside of a retainer and separate shipping and storage containers would have to be used.

Therefore, in accordance with the invention claimed a new and improved method of packaging cheese curd within a retainer is provided comprising the steps of lining the retainer with an endless sheet of impervious material, placing a double layer of porous absorbent material formed by a single piece of material folded over upon itself within the outline of the impervious material with the free ends of the material at one end of the retainer, filling the retainer with cheese curd, and removing the porous absorbent material after setting and pressing of the curd by pulling outwardly from the retainer on the end of the layer of porous absorbent material spaced from the curd thereby peeling the porous absorbent material off of the curd without removing the retainer from around the curd.

It is, therefore, one object of this invention to provide a new and improved method of packaging cheese.

Another object of this invention is to provide a new and improved method of packaging cheese curd in blocks weighing at least several hundred pounds.

A further object of this invention is to provide a new and improved method of packaging cheese curd wherein a layer of porous absorbent material is removed from the cheese curd without removing the curd from its retainer.

A still further object of this invention is to provide a new and improved method of packaging cheese curd wherein a temporary layer of porous absorbent material is peeled off of the curd while retained within an impervious wrapping.

A still further object of this invention is to provide a new and improved method of wrapping a block of cheese curd within an impervious wrapping without unsightly open and moist surfaces along the sides of the cheese block.

A still further object of this invention is to provide a new and improved method of packaging blocks of cheese of several hundred pounds wherein the drainage and wrapping of the cheese occurs while the cheese curd is retained within its forming and storage retainer.

Other objects and advantages of the invention will become apparent from the following description when read in connection with the accompanying drawings, in which:

FIG. 4 is a perspective view of the structure shown in FIG. 3 with a double layer of porous material formed by a single piece of material folded over upon itself within said retainer and along each side thereof and embodying the invention;

FIG. 5 is a cross sectional view of FIG. 4 taken along the line 4—4;

FIG. 6 is a partial view of FIG. 5 showing the porous sheet of material being peeled off of the cheese curd;

FIG. 7 is a cross sectional view of the structure shown in FIGS. 2–6 showing the retainer completely sealed with the impervious lining sealed to impervious end pieces to completely wrap the cheese curd;

Figure 1:
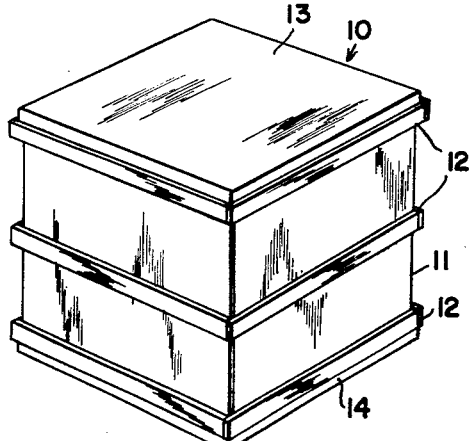
FIG. 1 is a perspective view of a retainer completely closed in the manner used when storing cheese curd.
Figure 8:
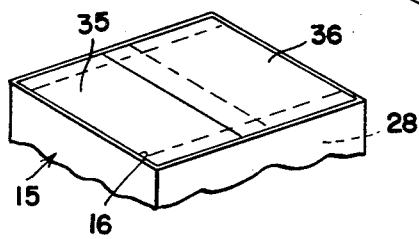
Figure 9:
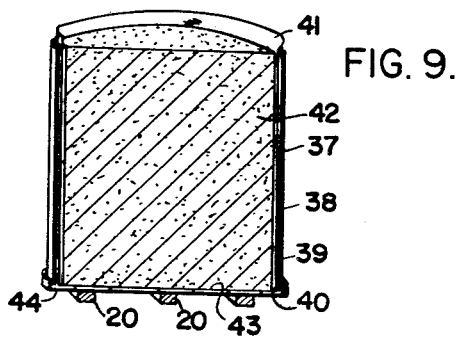

FIG. 8 illustrates a partial perspective view of the retainer shown in FIGS. 2–6 wherein the ends of the endless impervious lining fold over upon themselves to form the end of the wrapping; and FIG. 9 illustrates a partial perspective view of a further modification of FIG. 1 wherein a round barrel-like sleeve with impervious endless lining is shown utilizing the double porous absorbent material arrangement of the invention claimed.

Referring more particularly to the drawings by characters of reference FIG. 1 discloses a retainer 10 formed of any suitable material such as wood, metal, or plastic which may be designed to provide a flush, plain internal surface. In the structure shown in FIG. 1 the outer sides 11 of retainer 10 are provided with supporting ribs 12 and suitable top cover 13 and bottom cover 14 which may be fastened to the sides 11 of the retainer by screws (not shown) or any other fastening means in the usual way. Retainer 10 shown in FIG. 1 is the container utilized for receiving, draining, wrapping and storing the cheese curd. It may be also the container in which the cheese curd is sold. Although the method disclosed and claimed may be utilized on substantially any size package the retainer shown and described is provided for a 480 pound cheese block.

Figure 2:
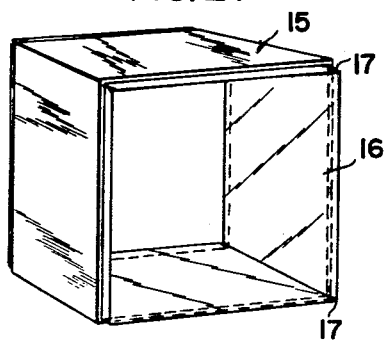
FIG. 2 is a perspective view of a modification of the retainer shown in FIG. 1 with both ends open and lying on its side and with an impervious lining arranged therein.

FIG. 2 illustrates a modification of the retainer shown in FIG. 1 wherein an open ended smooth sided retainer 15 is lined with an endless sheet covering all four sides of the retainer and protruding outwardly of the ends thereof. As noted from the drawing the impervious material which may be, for example, a transparent film, sheet or web of cellophane, polyethylene or any suitable plastic-like film such as saran or parakote is folded with a sharp crease at the corners so that it snugly fits the contour of the retainer. If desired the impervious lining may be shaped and formed before inserting into retainer 15. To aid in later sealing the impervious material 16 to impervious end materials (not shown in FIG. 2) slots 17 are made in each of the eight corners of the material extending outwardly of the retainer.

Figure 3:
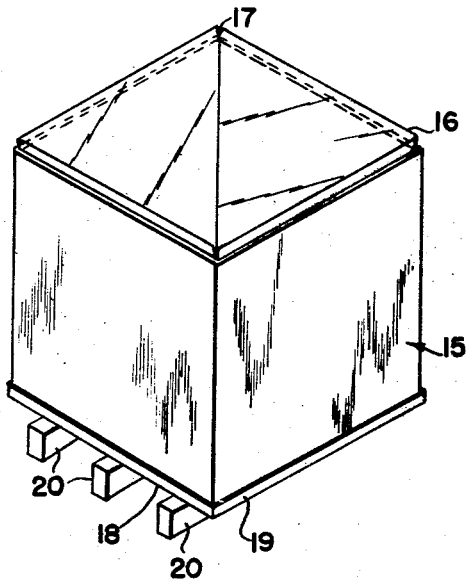
FIG. 3 is a perspective view of the retainer shown in FIG. 2 mounted on a skid with the bottom end closed by a perforated drain tray.

FIG. 3 illustrates the structure shown in FIG. 2 showing a perforated steel tray 18 loosely fitted over the lower end thereof. As shown more clearly in FIG. 5 material 16 is bent over the ends of retainer 15 on the lower end thereof so as to lie along the lip or edge 19 of tray 18. Retainer 16 and tray 18 are mounted on a skid 20. In accordance with the method disclosed a layer of porous material such as, for example, a cheese cloth 21 is arranged within retainer 15 over the perforated tray 18.

In accordance with the invention claimed a double layer of cheese cloth 22 (shown in FIGS. 4 and 5) formed by a single piece of material folded over upon itself is arranged within retainer 15 and lining 16 along each side of retainer 15 with the free ends 23 of cheese cloth 22 extending out from the upper end 25 of retainer 15. As noted from the drawings the porous absorbent cheese cloth material 22 is bent over upon itself in the shape of a U-shaped member with the bight 26 thereof being arranged at the bottom end 27 of retainer 15. In this manner when retainer 15 is filled with cheese curd 28 as shown in FIG. 5 each of the four double layer cheese cloths 22 extend from the bottom end 27 of retainer 15 and of the block of cheese curd 28 to the top end 25 of the retainer and cheese block 28.

In order to press the cheese sufficiently to cause it to drain a predetermined amount and firm up, a cover 29 is placed over the cheese curd 28 at the upper end of retainer 15. Before this occurs a layer of cheese cloth 30 may be placed on the cheese curd between the cheese curd and cover 29. Cover 29 is then weighted in any suitable manner such as by weights 31.

Usually within twenty-four hours weights 31, cover 29 and cheese cloth 30 are removed after which the double layer cheese cloths 22 are removed from each side of the block of the cheese curd 28. This occurs in the disclosed novel way by pulling on end 23 of the outer layer of cheese cloth 22 to gradually peel the cheese cloth off of the curd starting from the bottom of the retainer and proceeding to the top thereof. The cheese cloth peels off the block of cheese in a rolling action and slides against the impervious material as it is pulled out of the retainer.

FIG. 6 illustrates an enlarged view of this process showing cheese cloth 22 partly removed from one side of the block of cheese curd. After the cheese cloth is removed from each side thereof in the manner shown in FIG. 6 without disturbing the juxtapositioned layer of the impervious material 16 a layer 32 of impervious material is placed across the upper end of the block of cheese curd 28 and sealed by heat, glue or other suitable means to the ends of lining 16 to form a gas seal. Then cover 29 is replaced on the end 25 of retainer 15 and the retainer 15 including cover 29 is rotated 180 degrees, thereby placing the bottom 26 of retainer 15 on top. The drain tray 18 is then removed as well as cheese cloth 21 and a layer 33 of impervious material is placed across this end of the cheese block and sealed to the exposed ends of lining 16. A cover 34 is placed on end 26 of retainer 16 and the cheese curd then is completely sealed in a gas tight impervious wrapping and completely enclosed in retainer 15.

FIG. 7 is a cross sectional view showing the retainer 15 completely sealed with the cheese block 28 wrapped in a gas tight impervious wrapping comprising lining 16 and end layers 32 and 33.

Thus, a new and improved method of packaging a block of cheese curd is provided within an open ended vertically positioned retainer comprising the steps of lining the retainer with an endless sheet of impervious material, placing a drain tray at the bottom end of the retainer, placing a first layer of porous absorbent material on the inside of the drain tray, placing a double layer of porous material formed by a single piece of material folded over upon itself within the retainer on each side of the retainer and extending from one end of the retainer to the other end with the free ends of the material at the upper end of the retainer, filling the retainer with cheese curd, placing a second layer of porous material on the upper end of the retainer over the curd, applying pressure to the top of the curd to drain the curd through the layer of porous material at the bottom end of the retainer and through the double layers of porous material along the sides of the retainer, removing the porous material from the upper end of the retainer, pulling upwardly from the retainer on the outer ends of the double layers of porous material to peel the material from the sides of the block of curd, placing a sheet of impervious material on the upper end of the retainer and sealing it to the impervious endless lining, turning the retainer end for end and removing the drain tray and porous absorbent material therefrom, placing a sheet of impervious material on this end of the retainer, and sealing the second sheet of impervious material to the endless impervious material lining. The retainer thereby completely seals the curd in an impervious lining while remaining in the retainer. Upon the application of end caps to the retainer, the retainer is closed for storage or aging purposes. The retainer and wrapped block of cheese curd is opened when needed. By utilizing the claimed invention blocks of cheese ranging in size from several pounds to hundreds of pounds may be wrapped while remaining in their retainers and having surfaces completely closed leaving no curd openings which would detract from appearance or allow mold growth to enter the cheese.

FIG. 8 illustrates a further modification of the package shown in FIGS. 1–7 wherein the ends 35 and 36 of lining 16 are long enough to extend over the ends of the block of cheese curd 28 to completely gas seal this end of the wrapping, thereby eliminating the need for the layers 32 and 33 of FIGS. 1–7.

FIG. 9 illustrates a further modification of FIGS. 1–8 wherein a round barrel-like sleeve 37 is provided with an impervious lining 38. A double layer endless porous lining such as a cheese cloth material 39 is applied in the same manner as in FIGS. 1–6 with the doubled over end 40 at the bottom of the sleeve. Material 39 is removed by pulling on the outer layer 41 thereof to peel the cloth off of the barrel shaped cheese curd 42 starting from the bottom of the sleeve and proceeding to the top thereof in the same way as described for FIGS. 1–6. In this application of the process disclosed the ends of the impervious lining 36 may be overlapped and sealed together or an end member may be utilized in the manner of FIGS. 1–6 to seal the wrapper. A cheese cloth 43 and drain tray 44 are utilized in the manner and for the same purpose as described for FIGS. 1–8.

Although but a few embodiments of the present invention have been illustrated and described it will be apparent to those skilled in the art that various changes and modifications may be made therein without departing from the spirit of the invention or from the scope of the appended claims.

What I claim is:

1. A method of packaging cheese within a vertically arranged retainer comprising the steps of placing a double layer of porous absorbent material formed by a single piece folded over upon itself within said retainer and extending only from substantially the bottom of said retainer to the top thereof with the free ends of said material being arranged at the top end of said retainer, filling said retainer with cheese curd, and draining the liquid of said curd through said material and out of said retainer, and removing said material after a predetermined time by pulling the end of said layer of said material spaced from said curd out of said retainer thereby peeling said material off of said curd without removing said retainer from said curd.

2. A method of packaging cheese curd within a vertically arranged retainer comprising the steps of placing a double layer of porous absorbent material formed by a single piece folded over upon itself within said retainer and extending only from substantially the bottom of said retainer along each side of said retainer to the top thereof with the free ends of said material being arranged at the top end of said retainer, filling said retainer with cheese curd, draining the liquid of said curd through said material and out of said retainer, and removing said material from each side of said retainer after a predetermined time by pulling the end of said layer of said material spaced from said curd out of said retainer thereby peeling said material off of said curd without removing said retainer from said curd.

3. A method of packaging cheese curd within a vertically arranged retainer having a plurality of sides comprising the steps of placing a different double layer of porous absorbent material formed by a single piece folded over upon itself within said retainer and extending only from the bottom of said retainer along each side of said retainer to the top thereof with the material's free ends at the top end of said retainer, filling said retainer with cheese curd, draining the liquid of said curd through said material and out of the bottom of said retainer, and removing said material after a predetermined time from each side of said retainer by pulling the end of each layer of said material spaced from said curd out of said retainer thereby peeling said material off of said curd without removing said retainer from said curd.

4. A method of packaging cheese curd within a vertically arranged open ended retainer comprising the steps of lining the sides of said retainer with an impervious material, placing a double layer of porous absorbent material formed by a single piece folded over upon itself within the outline of said impervious material extending only from the bottom of said retainer to the top thereof with the free ends of said porous absorbent material at the top end of said retainer, filling said retainer with cheese curd, draining the liquid of said curd through said porous absorbent material and out of the bottom of said retainer and removing said porous absorbent material after a predetermined time by pulling the end of said layer of said porous absorbent material spaced from said curd out of said retainer thereby peeling said porous absorbent material off of said curd without removing said retainer from around said curd.

5. A method of packaging cheese curd within a vertically arranged open ended retainer having a plurality of sides comprising the steps of lining the sides of said retainer with a single piece of impervious material, placing a double layer of porous absorbent material formed by a single piece folded over upon itself within said retainer along each of its sides from the bottom to the top only with the material's free ends at the top of said retainer, filling said retainer with cheese curd, draining the liquid of said curd through said porous absorbent material and out of the bottom of said retainer and removing said porous absorbent material after a predetermined time from each side of said retainer by pulling the end of each layer of said porous absorbent material spaced from said curd out of said retainer thereby peeling said porous absorbent material off of said curd without removing said impervious material and said retainer from around said curd.

6. A method of packaging cheese curd within a vertically arranged open ended retainer comprising the steps of lining the sides of said retainer with an impervious material, placing a double layer of cheese cloth formed by a single piece folded over upon itself within the outline of said impervious material and extending only from the bottom to the top of said retainer with the free ends of said cheese cloth extending out of the top of said retainer, filling said retainer with cheese curd, draining the liquid of said curd through said cheese cloth and out of the bottom of said retainer and removing said cheese cloth after a predetermined time by pulling the end of said layer of said cheese cloth spaced from said curd out of said retainer to peel said cheese cloth off of said curd starting from the other end of said retainer without removing said retainer from around said curd.

7. A method of packaging cheese curd within an open ended retainer comprising the steps of lining the sides of said retainer with an impervious material, placing a layer of porous absorbent material on the bottom end of said retainer when vertically arranged, placing a double layer of porous absorbent material formed by a single piece folded over upon itself within said retainer along only the sides of said retainer with the free ends of said double layer of porous absorbent material at the upper end of said retainer, filling said retainer with cheese curd, draining the liquid of said curd out of said retainer through said layer of porous absorbent material at the bottom end and said double layer of porous absorbent material, pulling outwardly from said retainer on the end of the outer layer of said double layer of porous material to peel the absorbent material upwardly from the bottom end of said retainer and off of said curd.

8. A method of packaging cheese curd within an open ended retainer comprising the steps of lining said retainer with an endless sheet of impervious material, placing a layer of porous absorbent material on the bottom end of said retainer when vertically arranged, placing a double layer of porous absorbent material formed by a single piece folded over upon itself within said retainer and extending from one end of said retainer to the other end thereof with the free ends of said double layer of porous material at the upper end of said retainer, filling said retainer with cheese curd, applying pressure to the top of said curd to drain said curd through said layer of porous material at the bottom end of said retainer and through said double layer of porous material, pulling outwardly from said retainer on the end of the outer layer of said double layer of porous material to peel said double layer of porous material upwardly from the bottom end of said retainer and off of said curd.

9. A method of packaging cheese curd within an open ended retainer comprising the steps of lining said retainer with an impervious material, placing a layer of porous absorbent material on the bottom end of said retainer when vertically arranged, placing a double layer of porous absorbent material formed by a single piece folded over upon itself within said retainer and extending only from one end of said retainer to the other end thereof with the free end of said double layer of porous material at the upper end of said retainer, filling said retainer with cheese curd, draining said curd through said layer of porous material at the bottom end of said retainer and through said double layer of porous material, pulling outwardly from said retainer on the end of the outer layer of said double layer of porous material to peel said double layer of porous material upwardly from the bottom end of said retainer and off of said curd, sealing the ends of said impervious material over the upper end of said curd, removing the layer of porous material from the bottom end of said curd, and sealing said impervious material at said bottom end of said retainer over the bottom end of said curd thereby completely sealing said curd in an impervious lining while remaining within said retainer.

10. A method of packaging cheese curd within an open ended retainer comprising the steps of lining said retainer with an endless sheet of impervious material protruding from each end of said retainer, placing a layer of porous absorbent material on the bottom end of said retainer when vertically arranged, placing a double layer of porous absorbent material formed by a single piece folded over upon itself within said retainer and extending from one end of said retainer to the other end thereof with the free end of said double layer of porous absorbent material at the upper end of said retainer, filling said retainer with cheese curd, draining said curd through said layer of porous absorbent material at the bottom end of said retainer and through said double layer of porous absorbent material, pulling outwardly from said retainer on the end of the outer layer of said double layer of porous absorbent material to peel the material upwardly from the bottom end of said retainer and off of said curd, sealing the ends of said impervious material over the upper end of said curd, removing the layer of porous absorbent material from the bottom end of said curd, and sealing said impervious material at said bottom end of said retainer over the bottom end of said curd, thereby completely sealing said curd in an impervious lining while remaining within said retainer.

11. A method of packaging cheese curd within an open ended retainer comprising the steps of lining said retainer with an endless sheet of impervious material, placing a perforated drain tray at the bottom end of said retainer when vertically arranged, placing a layer of porous absorbent material on the inside of said drain tray, placing a double layer of porous absorbent material formed by a single piece folded over upon itself within said retainer with the free ends of said double layer of porous absorbent material at one end of said retainer, filling said retainer with cheese curd, draining said curd through said porous absorbent material and said tray, pulling outwardly on the end of the outer layer of said double layer of porous absorbent material to peel said double layer of porous absorbent material from said curd, sealing the ends of said impervious material over the upper end of said curd, removing said drain tray and said porous absorbent material from the bottom end of said retainer, and sealing said impervious material at said bottom end of said retainer thereby completely sealing said curd in an impervious lining while remaining within said retainer.

12. A method of packaging a block of cheese curd within an open ended vertically positioned retainer comprising the steps of lining said retainer with an impervious material, placing a perforated drain tray at the bottom end thereof, placing a first layer of porous absorbent cheese cloth on the inside of said drain tray, placing a double layer of a porous absorbent cheese cloth formed by a single piece of material folded over upon itself within said retainer and extending only from the bottom of said retainer to the top thereof with the free end of said double layer of porous absorbent cheese cloth at the upper end of said retainer, filling said retainer with cheese curd, placing a second layer of porous absorbent cheese cloth on the upper end of said retainer over said curd, placing a cover over said upper end of said retainer, after a predetermined draining period removing said cover from said retainer, removing said porous absorbent cheese cloth from the upper end of said retainer, pulling upwardly on the end of said outer layer of said double layer of porous absorbent cheese cloth to peel said double layer of porous absorbent cheese cloth from said curd, placing a first layer of impervious material over the upper end of said retainer, sealing said first layer of impervious material to said impervious retainer lining, turning said retainer end for end and removing said drain tray and said first porous absorbent cheese cloth therefrom, placing a second layer of impervious material over this end of said retainer, and sealing said second layer of impervious material to said impervious material lining thereby completely sealing said curd in an impervious lining while remaining within said retainer.

13. A method of packaging a block of cheese curd within an open ended vertically positioned retainer comprising the steps of lining said retainer with an endless sheet of impervious material, placing a drain tray at the bottom end thereof, placing a first layer of porous absorbent cheese cloth on the inside of said drain tray, placing a double layer of porous absorbent cheesecloth formed by a single piece folded over upon itself within said retainer and extending from one end of said retainer to the other end with the free ends of said double layer of porous absorbent cheesecloth at the upper end of said retainer, filling said retainer with cheese curd, placing a second layer of porous absorbent cheesecloth on the upper end of said retainer over said curd, applying pressure to the top of said curd to drain said curd through said first layer of porous absorbent cheese cloth at the bottom end of said retainer and through said double layer of porous absorbent cheese cloth, removing said second layer of porous absorbent cheese cloth from the upper end of said retainer, pulling upwardly from said retainer on the outer end of said double layer of porous absorbent cheese cloth to peel said double layer of porous absorbent cheese cloth from the sides of said block of curd, placing a first sheet of impervious material on the upper end of said retainer and sealing it to said impervious endless lining, turning said retainer end for end and removing said drain tray and said first layer of porous absorbent cheese cloth therefrom, placing a second sheet of impervious material on this end of said retainer, and sealing said second sheet of said imprevious material to said endless impervious material lining, said retainer thereby completely sealing said curd in an impervious lining while remaining in said retainer.

References Cited in the file of this patent

UNITED STATES PATENTS

| | | |
|---|---|---|
| Re. 23,489 | Toone | Apr. 29, 1952 |
| 1,915,488 | Gere | June 27, 1933 |
| 2,077,301 | Abrams et al. | Apr. 13, 1937 |
| 2,111,051 | Meyers | Mar. 15, 1938 |
| 2,760,430 | Pauly | Aug. 28, 1956 |